Nov. 25, 1969     T. F. KNAPP     3,480,815

MOTOR WITH MULTIPLEX WAVE WOUND DISC ARMATURE

Filed Dec. 27, 1965     2 Sheets-Sheet 1

INVENTOR.
Theodore F. Knapp.
BY
Carness, Dickey & Pierce.
ATTORNEYS.

Nov. 25, 1969    T. F. KNAPP    3,480,815
MOTOR WITH MULTIPLEX WAVE WOUND DISC ARMATURE
Filed Dec. 27, 1965    2 Sheets-Sheet 2
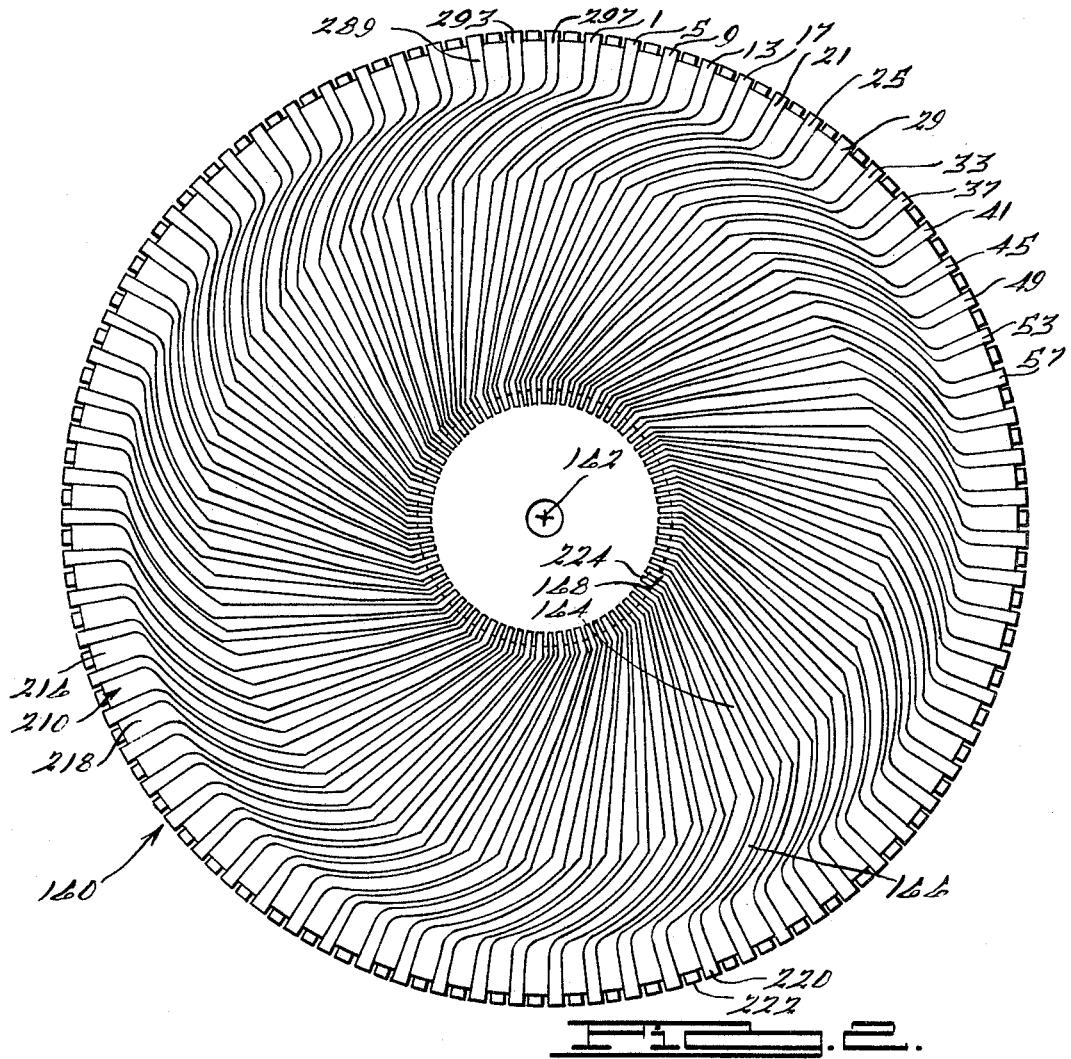
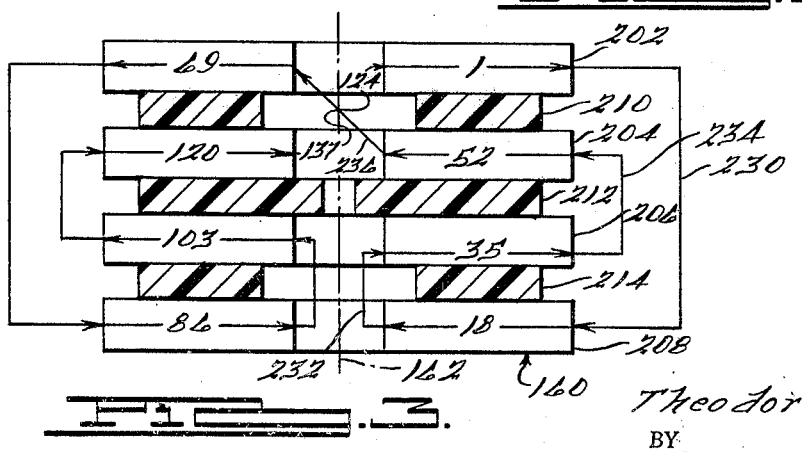
INVENTOR.
Theodore F. Knapp
BY
Carness, Dickey & Pierce
ATTORNEYS.

United States Patent Office 3,480,815
Patented Nov. 25, 1969

3,480,815
MOTOR WITH MULTIPLEX WAVE WOUND DISC ARMATURE
Theodore F. Knapp, Farmington, Mich., assignor, by mesne assignments, to Dura Corporation, a wholly-owned subsidiary of Walter Kidde & Company, Inc., Oak Park, Mich., a corporation of New York
Filed Dec. 27, 1965, Ser. No. 516,565
Int. Cl. H02k 1/22
U.S. Cl. 310—268                              6 Claims

ABSTRACT OF THE DISCLOSURE

An axial air gap motor with P-M stator and disc armature having at least four layers (equivalent to two windings) of radially extending conductor segments. The disc outer periphery is provided with end portion connectors between pairs of outer layer conductor segments and inner layer conductors segments, and the disc inner periphery is provided with end portion connectors between pairs of outer layer conductor segments and inner layer conductor segments, the connectors and segments providing at least one closed current path. The winding may be multiplex, e.g., duplex or triplex wave, progressive or retrogressive, singly or multiply reentrant. Axially extending commutator brushes directly engage central active portions of the segments of one outside layer.

---

This invention relates to rotating electric machinery of the axial air gap DC type utilizing a disc type armature, and more particularly to disc armature motors having multiplex windings.

In general, a multiplex winding is considered to be electrically equivalent to two or more simplex windings in parallel with one another. Although the use of multiplex windings has been suggested heretofore in connection with rotating electrical machinery utilizing conventional ring armatures and drum armatures, the possibility of using multiplex windings on disc armatures has apparently been given little or no consideration. Even the use of multiplex lap and wave windings in conventional ring and drum armature type devices apparently has met with relatively little commercial success and are believed to be seldom found in modern machines except perhaps in machines of very large current capacity.

Although the differences between the present invention and prior art multiplex windings will be readily apparent to those skilled in the art, reference is now made to the following general considerations associated with prior art multiplex windings. Conventional drum type lap and wave wound armatures generally have the same number of commutator bars as there are active coils, and coils are generally wound with a plurality of turns. Simplex lap windings have as many circuits in parallel as there are magnetic poles and require as many brushes as there are poles unless the commutator is cross connected. Simplex wave windings have only two circuits regardless of the number of poles and require only two brushes for commutation. Multiply reentrant multiplex wave wound armatures have a number of separate simplex wave windings equal to the multiplicity and utilize brushes of sufficient width to commutate all windings simultaneously. Singly reentrant multiplex wave wound armatures are connected to the commutator to form parallel paths equal to twice the multiplicity and utilize brushes of sufficient width to contact the required number of adjacent commutator bars. One of the problems in conventional multiplex windings has been the necessity to employ several sets of "equalizer" connections to insure that the total current in the armature will be equally divided between all of the multiple windings. As will become apparent, many of the prior art considerations in regard to multiplex windings have little or no applicability to the disc armature multiplex windings of the present invention.

The object of this invention is to provide an electric motor of the type utilizing a disc armature which has new and improved operating characteristics. A more specific object is to provide a disc armature winding and commutation arrangement by which new and improved operating characteristics in a direct current motor may be obtained.

In fulfillment of these objects, I have discovered that a multiplex wave winding may be formed on a disc armature and utilized in a disc armature motor arrangement to provide new and improved operating characteristics.

Among the various advantages of the present invention are:

(1) Ability to obtain variable motor performance characteristics by varying the number of parallel current paths in the armature winding by varying the multiplicity of the armature winding.

(2) Ability to obtain variable motor performance characteristics within certain relatively fixed motor characteristic parameters such as input voltage and armature size.

(3) Ability to increase motor efficiency by decreasing armature eddy current losses.

(4) Ability to reduce the number of conductors in series in parallel current paths in the armature winding for any given total number of conductors in the winding.

(5) Ability to obtain given motor performance characteristics at different applied input voltages by varying the number of current paths in the armature winding.

(6) Ability to provide narrower width inner and outer connecting tabs on generally radially extending conductor segments forming a wave winding on a disc armature.

(7) Ability to provide lower circulating currents in the parallel paths of a wave wound disc armature while maintaining a given set of motor operating characteristics.

(8) Ability to utilize fewer brushes than the number of poles in a disc armature motor having more than two parallel current paths in the disc armature winding.

In recent years, a great deal of work has been done in the disc armature motor art. Apparently, the prior art activity in this art has been primarily confined to simplex windings. The prior art disc armature windings have taken a variety of forms and have been variously adapted for interconnection of winding elements and for commutation.

While the use of multiplex windings in disc armatures, in accordance with the present invention, is thought to be generally applicable, it has been found to be particularly beneficial in, and adapted to, use with disc armatures having multiple layers of conductor segments formed by conductor layer patterns of identical form and numbers of conductor segments. In the presently preferred embodiment of the invention, a multixplex wave wound disc armature is formed by four layers of conductor segments of identical pattern and number. The many advantages and the details of construction of a wave wound four-layer armature, in simplex form, having conductor segments of identical number and pattern in each layer are discussed and described in detail in my copending application Ser. No. 288,152, filed June 17, 1963, the disclosure of which is specifically incorporated herein by reference.

In axial air gap disc armature type DC motors of the type disclosed in the aforementioned application and to which this invention relates, the disc armature rotates about a central axis so that generally radially extending circumferentially spaced conductor segments on the disc armature are rotated through generally axially extending lines of flux provided by circumferentially spaced magnetic poles axially spaced from the disc armature and radially outwardly located relative to the central axis.

Commutation is commonly effected by mounting brushes in axially extending relationship in surface engagement with exposed portions of the conductor segments on one or both outer faces of the disc armature.

The simplex wave winding described in the aforementioned copending application provides two parallel current circuits through the armature, which are the minimum number of current circuits possible with such an armature construction. This, in turn, provides the maximum number of torque producing conductors in series in each current circuit in the armature for a given number of conductor segments in each layer.

Some of the advantages of the present invention involve recognition of the fact that the number of torque producing conductors in series in the armature is a major design variable affecting the motor performance. In many applications, where applied voltage and other design parameters may be fixed, the number of torque producing conductors in the winding may be varied to obtain a desired performance at any given voltage input and any given set of other design variables.

For example, a motor arrangement of a given size, utilizing a four-layer simplex wave wound disc armature having 78 conductors in each layer, has certain performance characteristics with 24 volts DC applied. To obtain comparable performance characteristics with 12 volts DC applied, the obvious solution would appear to be to utilize a four-layer simplex wave wound armature of the same size having approximately one-half as many conductor segments, i.e. 39, in each layer with each conductor segment having approximately twice the original cross sectional area to correspondingly increase its current carrying capacity. Since it is desirable to utilize relatively thin conductor segments, usually the width is the only dimension which would be varied to change the cross sectional area. Increases in width, however, would greatly increase the eddy current losses in the armature. Thus, eddy current losses, and other factors would mitigate against adoption of a 39 conductor segment simplex wave wound armature. On the other hand, by use of the present invention, a four-layer duplex wave wound disc armature may be designed with four parallel current paths and an equivalent number, i.e. 75, conductor segments in each layer. Thus, approximately the same number of conductor segments may be provided in each layer as in the aforedescribed simplex winding so as to maintain approximately the same conductor segment width as in the aforedescribed simplex winding having the 78 conductor segments in each layer and, therefore, more nearly duplicate the motor performance characteristics at the lower input voltage. Furthermore, if a given current is divided into four parallel circuits in the duplex winding, the size (i.e. width) of the conductor segments may be correspondingly reduced. It has been found that the eddy current losses of a given motor arrangement may be substantially reduced by reducing the circumferential width of the faces of the conductor segments in each layer.

In the prior art, it has been a common practice to utilize conductor segments of variable width between the radially innermost portions and the radially outermost portions, and to separate adjacent conductor segments in each layer by uniform width insulation gaps. In the present invention, eddy current losses due to the circumferential width of the faces of the generally radially extending conductor segments is reduced by maintaining the circumferential width of the conductor segments substantially uniform from the radially inwardmost point to the radially outwardmost point while varying the width of insulating gap between adjacent conductor segments. By thus changing the conductor segment design from a variable width to a uniform width, the number of conductor segments in each layer may be increased and, through use of a multiplex wave wound disc armature, eddy current losses may be further reduced.

In order to obtain a multiplex wave wound disc armature motor arrangement formed from multiple layers of identically patterned conductor segments having identical numbers of conductors, the following must be fulfilled:

$$\frac{P}{2}n \pm m = \frac{Z}{2}$$

where:

(1) $P$=number of equally circumferentially spaced poles and $P/2$ equals the number of pole pairs.
(2) $n$=span of one turn, i.e. the number of circumferentially spaced conductor segment inner connection points from one conductor segment interconnection point of a turn to the other conductor segment interconnection point of the turn.
(3) $m$=winding multiplicity factor (duplex=2, triplex=3, etc.)
(4) $Z$=total number of armature conductor segments in all layers.
(5) $m$ being minus (−) for a progressive winding.
(6) $m$ being positive (+) for a retrogressive winding.
(7) The winding being singly reentrant if $n$ is not divisible by the multiplicity factor and multiply reentrant, with the number of reentrancies equal to the multiplicity, if $n$ is divisible by the multiplicity.

In a singly reentrant four-layer multiplex wave winding, all the conductor segments are connected in series with one another and a single closed current circuit through the winding is provided. The obtaining of four or more current paths in the singly reentrant multiplex winding depends upon proper placement of the commutating brushes so as to effectively divide the single closed current circuit, formed by the series connected conductor segments, into the desired number of current paths. When the multiplex wave winding is multiply reentrant, there will be a number of single closed simplex current circuits equal to the number of reentrancies and each simplex circuit will have an equal number of conductor segments. Each simplex circuit may be divided into two current paths by proper commutation.

For application to a wave wound disc armature having four layers of conductor segments of identical pattern and number, and commutated on one face only, $n$ must be an odd integer, and an even number of pole pairs must be used if the multiplicity factor is an even number, and an odd number of pole pairs must be used if the multiplicity is an odd number.

In a four-layer multiplex wave wound armature to be commutated by brushes contacting one face, only one-quarter of the conductor segments in any single closed circuit are located in the one face and can be used for commutation. On the other hand, in a conventional motor there is a commutator bar for every coil and conventional multiplex winding can be commutated by merely increasing the width of the brushes. However, commutation of the disc armature multiplex winding by merely increasing the width of the brushes to contact more commutator segments, such as provided in conventional motors, will not correctly commutate the multiplex four-layer disc armature. It has been discovered that provision of two brushes, in addition to the two brushes utilized to commutate a simplex winding of a disc armature, properly positioned in a certain angular relationship while contacting the same armature face, will form multiple parallel circuit paths and commutate a singly reentrant multiplex wave wound four-layer disc armature. Also, it has been discovered that four brushes can be used to commutate a multiply reentrant multiplex wave wound four-layer disc armature, and in a similar manner, a two-layer disc armature may be commutated by two brushes.

Referring now to the drawings, a presently preferred illustrative embodiment of the invention is shown wherein:

FIG. 2 is a side elevational view of a four-layer multiplex wave wound disc armature as shown schematically in FIG. 1; and FIG. 3 is a schematic cross sectional view of the armature of FIG. 1 illustrating schematically the winding path from layer to layer of conductor segments in the armature.

Figure 1:
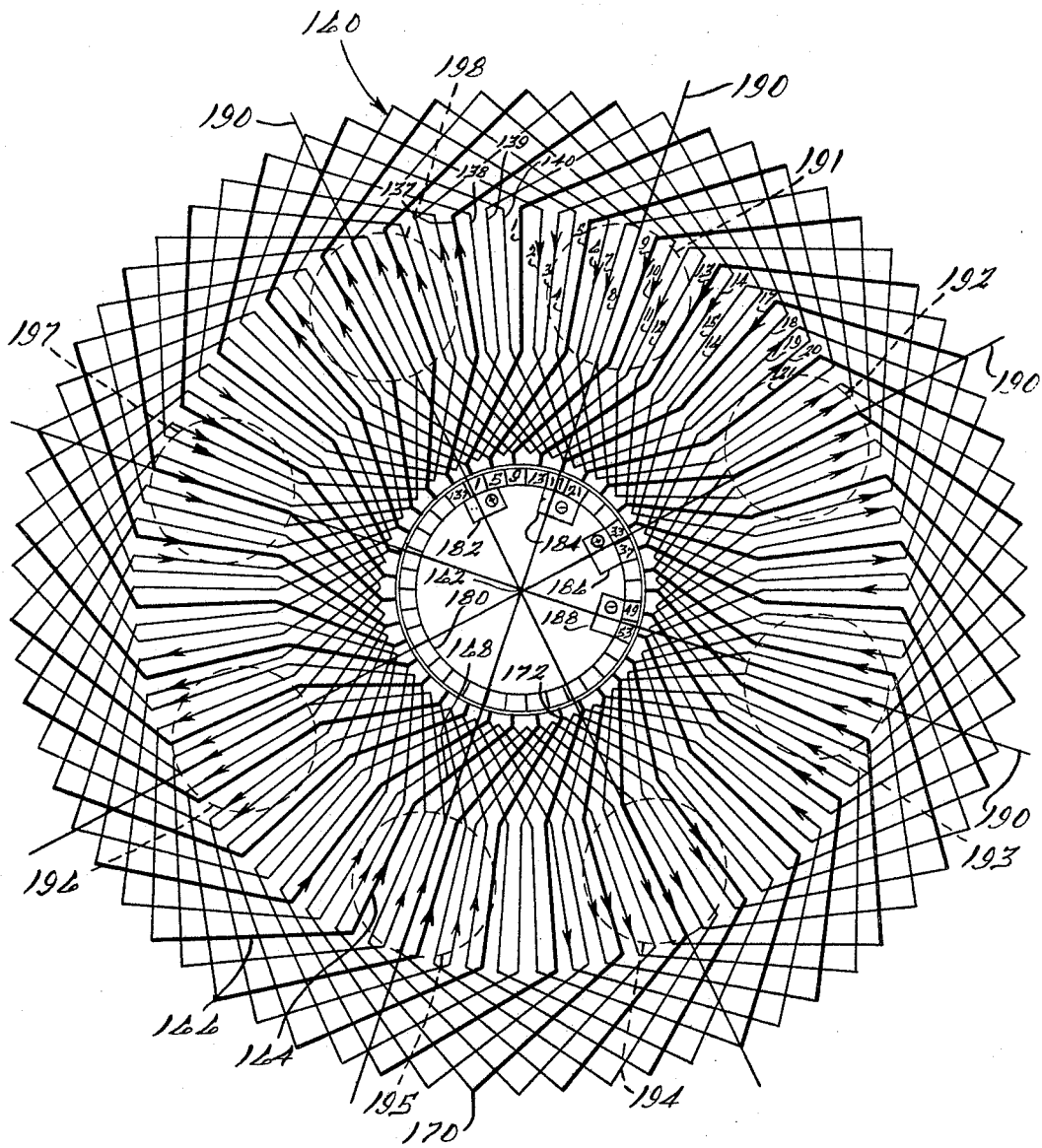
FIG. 1 is a schematic layout of an illustrative four-layer multiplex singly reentrant wave wound disc armature motor arrangement embodying the inventive principles.

Referring now to FIG. 1, an eight pole, duplex, singly reentrant, wave wound, disc armature motor arrangement is shown schematically. It is to be understood that the current paths in the winding are shown by interconnected radially extending lines which represent generally radially extending conductor segments of substantial width actually mounted in four axially spaced parallel planes forming four layers of conductor segments as will be more readily apparent by reference to FIG. 3. The illustrative duplex wave winding of FIG. 1 is retrogressive and singly reentrant. The winding consists of a total of 140 radially extending conductor segments, represented by radially extending lines 1–140, a portion of which have been numbered in FIG. 1, which are arranged in four layers of conductor segments to form a laminated disc armatue 160 rotatable about a central axis 162. The heavy lines, 1, 5, 9, etc., represent conductor segments in an outer layer, hereinafter sometimes referred to as the front layer, i.e. the layer on which commutation is effected, light lines 2, 6, 10, etc., represent conductor segments in another outer layer, hereinafter sometimes referred to as the rear layer, light lines 3, 7, 11, etc., represent conductor segments in an inner layer adjacent the rear outer layer, and light lines 4, 8, 12, etc., represent conductor segments in another inner layer adjacent the front outer layer. Each conductor segment includes a more radial central portion 164 of substantial width and less radial circumferentially elongated end portions 166, 168 by which circumferentially spaced conductor segments are connected to one another. The layers of conductor segments are identical in number and pattern but with inside layers reversely positioned relative to the outside layers. In other words, the outer end portion of conductor segment 1 extends in an opposite circumferential direction to the outer end portion of conductor segment 4 and the outer end portion of conductor segment 3 extends in an opposite circumferential direction to the outer end portion of conductor segment 2. Each layer has 35 conductor segments. The inner and outer ends of each conductor segment are connected in series to the other conductor segments by suitable end tab connections 170, 172. Each conductor segment in each outside layer is connected at its radial inner end to an adjacent overlapping inner end of a conductor segment in each inside layer. Each conductor segment in each outside layer is connected at its outer end to an overlapping outer end of a conductor segment in the other outside layer. Each conductor segment in each inside layer is connected at its radial outer end to an overlapping outer end of a conductor segment in the other inside layer. Every fourth conductor segment 1, 5, 9, et seq., is illustrated by a heavy line and represents conductor segments in one outside face upon which the armature winding is commutated. For purposes of illustration, only a commutator ring 180 is shown with segments connected to each of the outer front face conductor segments 1, 5, 9, et seq. For purposes of discussion, each commutator segment may be considered to have a number corresponding to the number of the conductor segment to which it is connected as indicated by the partial numbering 1, 5, 9, thereon. It is to be understood that, in the illustrative embodiment, the commutation is obtained directly on the exposed faces of the conductor segments 1, 5, 9, et seq., which correspond to the commutator ring segments.

Commutation is obtained by four axially extending brush elements 182, 184, 186, 188 which are located on or about the pole axes 190 of eight equally circumferentially spaced magnetic poles of alternate polarity 191, 192, 193, 194, 195, 196, 197, 198. Since there are eight poles spaced at 45°, the brushes are placed at 45° intervals or multiples thereof. By way of illustration, the location of brushes 182, 184, 186, 188 is shown in relation to commutation ring 180 but would actually be located opposite the central portions 164 of the corresponding commutated conductor segments 1, 5, 9, et seq., in surface engagement therewith. The direction of current flow at a particular instant of operation, with the brushes in the positions indicated, is shown by means of the arrow heads on the lines 1–140.

In order to analyze the arrangement of conductor segments, the current flow, and commutation, the motor arrangement of FIG. 1 is illustratively shown in the following chart which represents an eight pole disc armature motor arrangement having 140 conductor segments arranged in four layers and forming a singly reentrant multiplex wave wound winding commutated on one face by four brushes:

CHART I
F = Front Layer With Commutating Face
IF = Inside Front Layer
IR = Inside Rear Layer
R = Rear Layer
(−17) etc. = Contacted By Negative Brush
(+137) etc. = Contacted By Positive Brush

| F | R | IR | IF | F | R | IR | IF |
|---|---|---|---|---|---|---|---|
| (+1) | 18 | 35 | 52 | 69 | 86 | 103 | 120 |
| (+137) | 14 | 31 | 48 | 65 | 82 | 99 | 116 |
| 133 | 10 | 27 | 44 | 61 | 78 | 95 | 112 |
| 129 | 6 | 23 | 40 | 57 | 74 | 91 | 108 |
| 125 | 2 | 19 | 36 | (−53) | 70 | 87 | 104 |
| 121 | 138 | 15 | 32 | (−49) | 66 | 83 | 100 |
| 117 | 134 | 11 | 28 | 45 | 62 | 79 | 96 |
| 113 | 130 | 7 | 24 | 41 | 58 | 75 | 92 |
| 109 | 126 | 3 | 20 | (+37) | 54 | 71 | 88 |
| 105 | 122 | 139 | 16 | (+33) | 50 | 67 | 84 |
| 101 | 118 | 135 | 12 | 29 | 46 | 63 | 80 |
| 97 | 114 | 131 | 8 | 25 | 42 | 59 | 76 |
| 93 | 110 | 127 | 4 | (−21) | 38 | 55 | 72 |
| 89 | 106 | 123 | 140 | (−17) | 34 | 51 | 68 |
| 85 | 102 | 119 | 136 | 13 | 30 | 47 | 64 |
| 81 | 98 | 115 | 132 | 9 | 26 | 43 | 60 |
| 77 | 94 | 111 | 128 | (+5) | 22 | 39 | 56 |
| 73 | 90 | 107 | 124—(1) | | | | |

In the position represented in the chart and in FIG. 1, positive brush 182 is in contact with conductor segments 1, 5, and 137, positve brush 186 is in contact with conductor segments 33, 37, negative brush 184 is in contact with conductor segments 17, 21, and negative brush 188 is in contact with conductor segments 49, 53. Thus, four current paths are established in the winding between (1) positive brush 182 on conductor segment 137 and negative brush 188 on conductor segment 53, (2) negative brush 188 on conductor segment 49 and positive brush 186 on conductor segment 37, (3) positive brush 186 on conductor segment 33 and negative brush 184 on conductor segment 21, and (4) negative brush 184 on conductor segment 17 and positive brush 182 on conductor segment 5. Accordingly, in operation of the motor, as the position of the brushes on the conductor segments continuously changes, it will be seen that the arrangement of the winding, the magnetic poles, and the brushes are such as to continuously commutate the rotating armature in a manner providing four current paths through a duplex winding.

In the preferred embodiment, the condition $$\frac{P}{2}n \pm m = \frac{Z}{2}$$

is fulfilled as $$\frac{8}{2}(17) + 2 = \frac{140}{2}$$

with $n=17$ being odd, $Z=140$ being divisible by four, the multiplicity=2 being even, the number of pole pairs=4 being even, and the number of reentrancies=1 as $n$ is not divisible by the multiplicity.

Referring now to FIG. 3, the four-layer disc armature 160, having the aforedescribed duplex winding, is shown to comprise multiple layers of conductor segments 202, 204, 206, 208. Suitable layers of insulation 210, 212, 214 separate the layers of conductor segments. In FIG. 2, by way of example, one outer layer of 75 conductor segments 1, 5, 9, 13, et seq., of an armature having a total of 300 conductor segments is shown in its entirety. As previously described, each conductor layer pattern is identical but adjacent layers are reversely positioned back to back. The conductor layer pattern is formed by a series of generally radially extending, identically contoured, relatively thin, substantially uniform width conductor segments having the aforedescribed central portion 164, outer circumferentially extending portion 166, and inner circumferentially extending portion 168. The conductor segments in each layer are spaced from one another circumferentially and insulated from one another by insulation gaps 216, 218. The width of each insulation gap varies radially. The conductor segments in each layer are suitably connected at their inner and outer radial ends 220, 222, 224 to conductor segments in the other layers to form the desired winding as will be more readily apparent by reference to the schematic illustration of FIG. 3 which shows a portion of the winding of FIG. 1. In FIG. 3, conductor segment 1, in front outer layer 202, is connected at the outer periphery by overlapping tab portions (represented by line 230) to conductor segment 18 in rear outer layer 208. Conductor segment 18 is connected at the inner periphery by overlapping tab portions (represented by line 232) to conductor segment 35 in the adjacent inner layer 206. Conductor segment 35 is connected at the outer periphery by overlapping tab portions (represented by line 234) to conductor segment 52 in the other inner layer 204. Conductor segment 52 is connected at the inner periphery by overlapping tab portions (represented by line 236) to conductor segment 69 in front outer layer 202. In a similar manner all the conductor segments are connected in series as further illustrated schematically by conductor segment lines 69, 86, 103, 120, et seq., with conductor segment 124 being connected to conductor segment 1 to close the winding.

An additional example of a wave wound multiplex disc armature motor arrangement comprising eight poles with 60 conductor segments arranged in four layers in a singularly reentrant, retrogressive, duplex winding commutated by four brushes is illustrated by the following chart:

CHART II

| F | IF | IR | R | F | IF | IR | R |
|---|---|---|---|---|---|---|---|
| (−1) | 54 | 47 | 40 | 33 | 26 | 19 | 12 |
| (+5) | 58 | 51 | 44 | 37 | 30 | 23 | 16 |
| (+9) | 2 | 55 | 48 | 41 | 34 | 27 | 20 |
| (−13) | 6 | 59 | 52 | 45 | 38 | 31 | 24 |
| 17 | 10 | 3 | 56 | 49 | 42 | 35 | 28 |
| 21 | 14 | 7 | 60 | (+53) | 46 | 39 | 32 |
| 25 | 18 | 11 | 4 | (−57) | 50 | 43 | 36 |
| 29 | 22 | 15 | 8−(1) | | | | |

Thus, in the illustrative position, four current paths are established between (1) a negative brush on conductor segment 1 and a positive brush on conductor segment 5, (2) a positive brush on conductor segment 9 and a negative brush on conductor segment 13, (3) a negative brush on conductor segment 13 and a positive brush on conductor segment 53, and (4) a positive brush on conductor segment 53 and a negative brush on conductor segment 57.

In this example, the condition $$\frac{P}{2}n \pm m = \frac{Z}{2}$$

is fulfilled as $$\frac{8}{2}(7) + 2 = \frac{60}{2}$$

with $n=7$ being odd, $Z=60$ being divisible by four, the multiplicity=2 being even, the number of pole pairs=4 being even, and the number of reentrancies=1 being as $n$ is not divisible by the multiplicity.

Another example of a wave wound multiplex disc armature motor arrangement comprising 10 poles and 96 conductor segments arranged in four layers in a triply reentrant, retrogressive, triplex winding commutated by four brushes is illustrated by the following chart:

CHART III

| F | IF | IR | R | F | IF | IR | R |
|---|---|---|---|---|---|---|---|
| (+1) | 88 | 79 | 70 | 61 | 52 | 43 | 34 |
| 25 | 16 | 7 | 94 | 85 | 76 | 67 | 58 |
| 49 | 40 | 31 | 22 | (−13) | 4 | 91 | 82 |
| 73 | 64 | 55 | 46 | 37 | 28 | 19 | 10−(1) |
| (−89) | 80 | 71 | 62 | 53 | 44 | 35 | 26 |
| 17 | 8 | 95 | 86 | (+77) | 68 | 59 | 50 |
| 41 | 32 | 23 | 14 | (+5) | 92 | 83 | 74 |
| 65 | 56 | 47 | 38 | 29 | 20 | 11 | 2−(89) |
| (+81) | 72 | 63 | 54 | 45 | 36 | 27 | 18 |
| (−9) | 96 | 87 | 78 | 69 | 60 | 51 | 42 |
| 33 | 24 | 15 | 6 | (−93) | 84 | 75 | 66 |
| 57 | 48 | 39 | 30 | 21 | 12 | 3 | 90−(81) |

In this arrangement, it may be observed that there are three separate simplex wave windings, each having 32 conductor segments connected in series. It is to be understood that the conductor segment numbering system utilized in the chart is based upon progressively numbering circumferentially adjacent conductor segments. In other words, conductor segments 1, 5, 9, et seq., and 2, 6, 10, et seq., are adjacent one another in the outside layers and conductor segments 4, 8, 12, et seq., and 3, 7, 11, et seq., are adjacent one another in the inside layers even though they form parts of separate simplex windings. The winding may be commutated by four brushes correctly positioned and contacting, in the illustrative position, conductor segments 1, 5, 9, 13, 77, 81, 89, and 93 so as to provide two current paths in each simplex wave winding and a total of six current paths in the armature. Thus, in the first simplex winding, two current paths are provided between the brushes on conductor segments 1 and 13. In the second simplex winding, a current path is provided between the brushes on conductor segments 5 and 89 and a current path is provided between the brushes on conductor segments 77 and 89. In the third simplex winding, a current path is provided between the brushes on conductor segments 9 and 81 and a current path is provided between the brushes on conductor segments 81 and 93.

In this example, the condition $$\frac{P}{2}n \pm m = \frac{Z}{2}$$

is fulfilled as $$\frac{10}{2}(9) + 3 = \frac{96}{2}$$

with $n$ being odd, $Z=96$ being divisible by four, the multiplicity=3 being odd, the number of pole pairs=5 being odd, and the number of reentrancies=3 as $n$ is divisible by the multiplicity.

While a four-layer armature multiplex winding is presently preferred, and provides particular advantages, it is contemplated that armatures with more or less layers of conductor segments may also advantageously utilize multiplex windings. An example of a wave wound multiplex disc armature motor arrangement comprising 8 poles and 60 conductor segments arranged in two layers in a singularly reentrant, retrogressive, duplex winding commutated by two brushes is illustrated by the following chart:

CHART IV

| F | R | F | R |
|---|---|---|---|
| (−1) | 54 | 47 | 40 |
| 33 | 26 | 19 | 12 |
| 5 | 58 | 51 | 44 |
| 37 | 30 | 23 | 16 |
| 9 | 2 | (+55) | 48 |
| 41 | 34 | 27 | 20 |
| 13 | 6 | 59 | 52 |
| 45 | 38 | 31 | 24 |
| 17 | 10 | (−3) | 56 |
| 49 | 42 | 35 | 28 |
| 21 | 14 | 7 | 60 |
| (+53) | 46 | 39 | 32 |
| 25 | 18 | 11 | 4 |
| 57 | 50 | 43 | 36 |
| 29 | 22 | 15 | 8−(1) |

In this arrangement, all of the conductor segments are connected in series. Four current paths are provided by commutation with only two brushes correctly located and providing current paths in the illustrative position between (1) conductor segments 1 and 55, (2) conductor segments 1 and 53, (3) conductor segments 3 and 53, and (4) conductor segments 3 and 55.

In this example, the condition $$\frac{P}{2} n \pm m = \frac{Z}{2}$$

is fulfilled as $$\frac{8}{2}(7) + 2 = \frac{60}{2}$$

with $n=7$ being odd, $Z=60$ being divisible by two, the multiplicity being even, the number of pole pairs=4 being even, and the number of reentranceis=1 as $n$ is not divisible by the multiplicity.

An example of a wave wound multiplex two-layer disc armature motor arrangement comprising eight poles and 68 conductor segments arranged in two layers to form a doubly reentrant, retrogressive, duplex winding commutated by two brushes is illustrated by the following chart:

CHART V

| F | R | F | R |
|---|---|---|---|
| (−1) | 62 | 53 | 46 |
| 37 | 30 | 21 | 14 |
| (−5) | 66 | 57 | 50 |
| 41 | 34 | 25 | 18 |
| 9 | 2 | (+61) | 54 |
| 45 | 38 | 29 | 22 |
| 13 | 6 | (+65) | 58 |
| 49 | 42 | 33 | 26 |
| 17 | 10−(1) | | |
| (−3) | 64 | 55 | 48 |
| 39 | 32 | 23 | 16 |
| 7 | 68 | 59 | 52 |
| 43 | 36 | 27 | 20 |
| 11 | 4 | (+63) | 56 |
| 47 | 40 | 31 | 24 |
| 15 | 8 | 67 | 60 |
| 51 | 44 | 35 | 28 |
| 19 | 12−(3) | | |

In this arrangement there are two separate simplex wave windings each having 34 conductor segments connected in series. Two brushes are provided to simultaneously commutate both windings and to provide four current paths. In the illustrative position, in the first winding, the positive brush contacts conductor segments 61 and 65 and the negative brush contacts conductor segments 1 and 5 to provide two current paths. In the second winding, the positive brush contacts conductor segment 63 and the negative brush contacts conductor segment 3 to provide two more current paths.

In this example, the condition $$\frac{P}{2} n \pm m = \frac{Z}{2}$$

is fulfilled as $$\frac{8}{2}(8) + 2 = \frac{68}{2}$$

with $n=8$ being even, $Z=68$ being divisible by two, the multiplicity=2, being even, the number of pole pairs=4 being even, and the number of reentrancies=2 as $n$ is divisible by the multiplicity.

As a result of the present invention, new and improved motor arrangements have been devised by which, with a given set of motor variables, lower applied voltages may be utilized to obtain motor performance equivalent to that previously obtained by utilization of higher applied voltages. With the new and improved multiplex disc armature windings, it is also possible to provide conductor segment connection tabs at the radial extremities of the conductor segments which are of smaller width facilitating assembly operations by which the tabs are connected to one another to form the armature winding. The multiplex wave wound disc armatures of this invention also result in the ability to utilize lowered circulating currents in a particular motor arrangement with a given input voltage. A further advantage of this invention, is that commutation may be effected with a fewer number of brushes than the number of poles.

Since the inventive principles may be variously applied to obtain the many advantages of this invention, it is intended that the appended claims be construed to include various alternative embodiments except insofar as expressly limited to any particular embodiment or arrangement and as limited by the prior art.

What is claimed is:

1. A disc armature axial air gap type electric rotating motor having a multiplex winding form, comprising:
   a disc armature rotatable about a central axis,
   magnet means axially spaced from said armature and having a number of magnetic poles circumferentially and radially spaced about said central axis,
   at least four axially spaced layers of generally radially extending conductor segments carried by and supported on said disc armature, said conductor segments having central active portions and inner and outer end portions, the number of conductor segments in each layer being equal,
   multiplex form winding means comprising disc outer periphery end portion connectors between pairs of outer layer conductor segments and inner layer conductor segments, disc inner periphery end portion connectors between pairs of outer layer conductor segments and inner layer conductor segments, said inner and outer end portion connectors and said conductor segments providing at least one closed current path,
   each closed current path including conductor segments from each layer,
   at least two axially extending commutation brushes radially positioned between said end portion connectors opposite said conductor segments and directly engaging various ones of said conductor segments in one layer as said armature rotates,
   each brush engaging at least one different conductor segment in the one layer of the armature, and said brushes effectively dividing said winding means into at least four parallel current paths.

2. The invention as defined in claim 1 and wherein said commutation means comprising at least four brushes electrically connected to said conductor segments.

3. The invention as defined in claim 1 and wherein: said winding means comprises a plurality of layers of generally radially extending conductor segments, said conductor segments being connected in series and forming at least one wave winding, each layer of conductor segments having the same number of conductor segments, and said winding means being constructed according to the equation $$\frac{P}{2}n \pm m = \frac{Z}{2}$$

where:

(1) P=number of equally circumferentially spaced poles and P/2 equals the number of pole pairs.
(2) n=span of one turn, i.e. the number of circumferentially spaced conductor segment inner connection points from one conductor segment interconnection point of a turn to the other conductor segment interconnection point of the turn.
(3) m=winding multiplicity factor (duplex=2, triplex=3, etc.)
(4) Z=total number of armature conductor segments in all layers.
(5) m=being minus (−) for a progressive winding.
(6) m being positive (+) for a retrogressive winding.
(7) The winding being singly reentrant if n is not divisible by the multiplicity factor and multiply reentrant, with the number of reentrancies equal to the multiplicity, if n is divisible by the multiplicity.

4. The invention as defined in claim 3 and wherein: said winding means comprising four layers of generally radially extending conductor segments, the conductor segments being identical and arranged in identical patterns in each layer, Z being divisible by four, n being an odd integer, and the number of pole pairs being an even number when the multiplicity is an even number and being an odd number when the multiplicity is an odd number.

5. The invention as defined in claim 4 and wherein said commutation means comprising four brushes electrically connected to said conductor segments.

6. The invention as defined in claim 1 and the conductor segments extending generally radially and being of uniform circumferential width along the radial length thereof.

References Cited

UNITED STATES PATENTS

| | | | |
|---|---|---|---|
| 1,628,613 | 5/1927 | Powell | 310—205 |
| 1,685,737 | 9/1928 | Albrecht | 310—205 |
| 1,685,738 | 9/1928 | Albrecht | 310—205 |
| 3,095,516 | 6/1963 | Moressee et al. | 310—268 |
| 3,109,114 | 10/1963 | Henry-Baudot | 310—268 |
| 3,144,574 | 8/1964 | Henry-Baudot | 310—268 |
| 3,189,773 | 6/1965 | Henry-Baudot | 310—268 |
| 3,296,474 | 1/1967 | Henry-Baudot | 310—268 |
| 3,209,187 | 9/1965 | Angele | 310—266 |
| 3,227,903 | 1/1966 | Henry-Baudot | 310—268 |
| 3,231,771 | 1/1966 | Henry-Baudot | 310—207 |
| 3,312,846 | 4/1967 | Henry-Baudot | 310—266 |
| 3,356,877 | 12/1967 | Burr | 310—266 |
| 3,382,570 | 5/1968 | Knapp et al. | 310—268 X |

FOREIGN PATENTS 902,295   8/1962   Great Britain.

OTHER REFERENCES

Kloeffler et al.: Direct-Current Machinery, pp. 44–59, The MacMillan Co., New York, 1949.

WARREN E. RAY, Primary Examiner

U.S. Cl. X.R.

310—205